United States Patent [19]

Proulx et al.

[11] Patent Number: 4,914,967
[45] Date of Patent: Apr. 10, 1990

[54] CROSSOVER MECHANISM FOR GUIDING A CAM FOLLOWER THROUGH A CAM TRACK INTERSECTION

[75] Inventors: Edward A. Proulx, Burlington; Glenn E. Rossier, Vergennes, both of Vt.

[73] Assignee: General Electric Company, Burlington, Vt.

[21] Appl. No.: 289,333

[22] Filed: Dec. 23, 1988

[51] Int. Cl.⁴ .............................................. F16H 25/12
[52] U.S. Cl. .......................................... 74/57; 74/58; 74/89.15
[58] Field of Search .............. 74/89.15, 424.8 R, 57, 74/58

[56] References Cited

U.S. PATENT DOCUMENTS

| | | | |
|---|---|---|---|
| 714,416 | 11/1902 | Weaver | 74/57 |
| 1,734,649 | 11/1929 | Shull | 74/57 |
| 2,262,963 | 11/1941 | Procissi | 121/119 |
| 2,747,417 | 5/1956 | Brown | 74/57 |
| 2,849,921 | 9/1958 | Otto | 89/12 |
| 2,998,757 | 9/1961 | Herlach et al. | 89/155 |
| 3,036,810 | 5/1962 | Conrad et al. | 251/95 |
| 3,241,448 | 3/1966 | Rocha | 89/161 |
| 3,792,819 | 2/1974 | Schippers | 242/43 |
| 3,854,343 | 12/1974 | May | 74/57 |
| 4,154,143 | 5/1979 | Pechamat et al. | 89/11 |
| 4,216,698 | 8/1980 | Chiabrandy | 89/12 |
| 4,294,158 | 10/1981 | Patenaude et al. | 89/12 |
| 4,535,642 | 10/1985 | Ohmura | 74/58 |
| 4,570,500 | 2/1986 | Richter | 74/54 |

Primary Examiner—Leslie A. Braun
Assistant Examiner—Scott Anchell
Attorney, Agent, or Firm—Bailin L. Kuch; Robert A. Cahill

[57] ABSTRACT

To guide a cam follower through the intersection of crossing portions of a cam track, a crossover mechanism is provided with a pair of crossover cam members which are separately, telescopically reciprocated to momentarily insert cam segments into the intersection in properly timed relation with the arrival thereat of the cam follower in its movement along either of the crossing track portions.

14 Claims, 2 Drawing Sheets

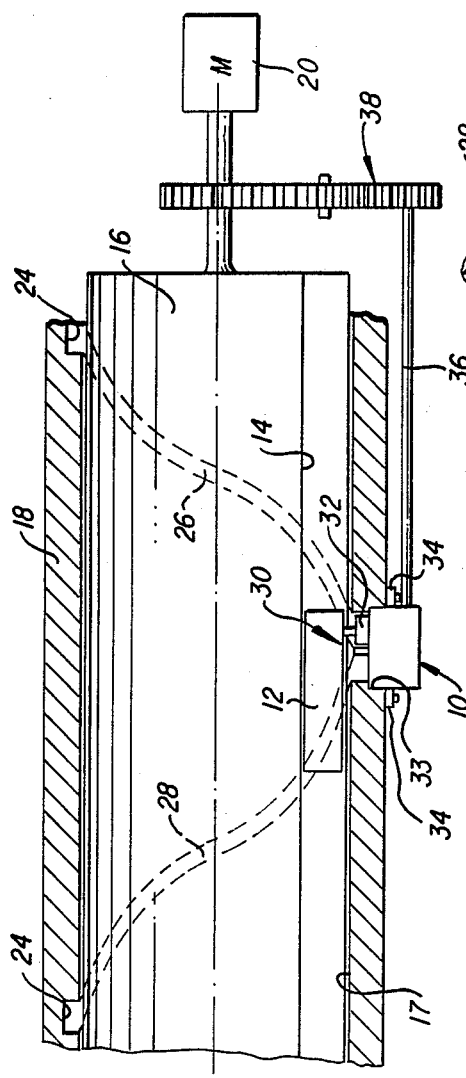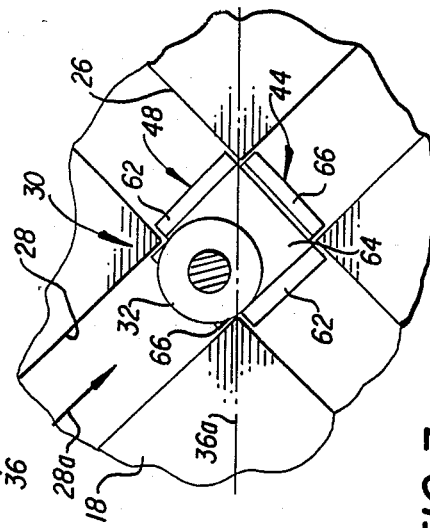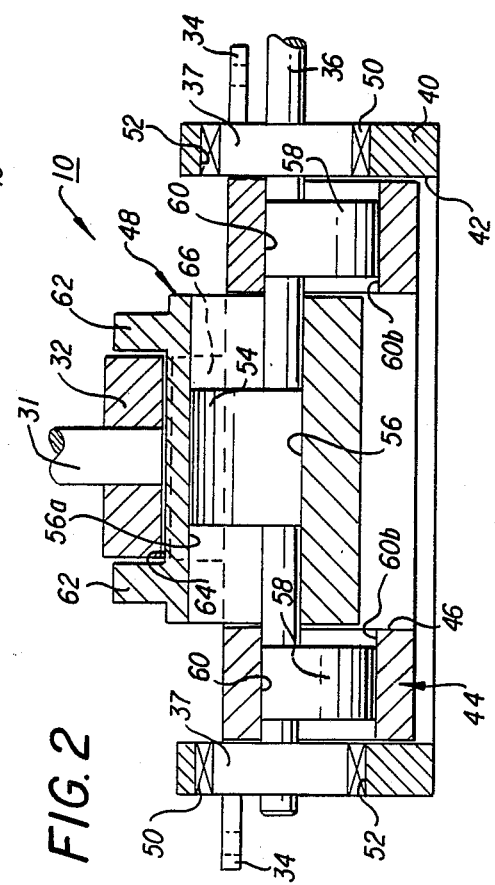
FIG. 1
FIG. 2
FIG. 3

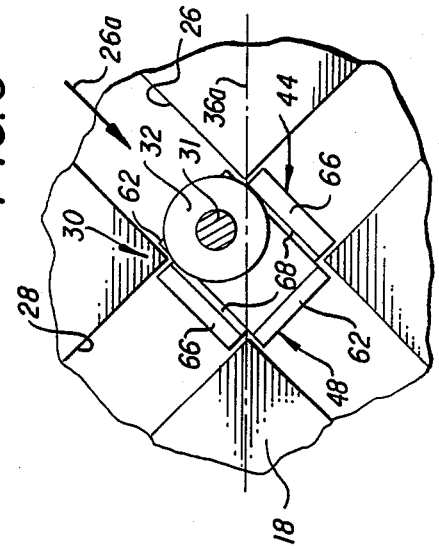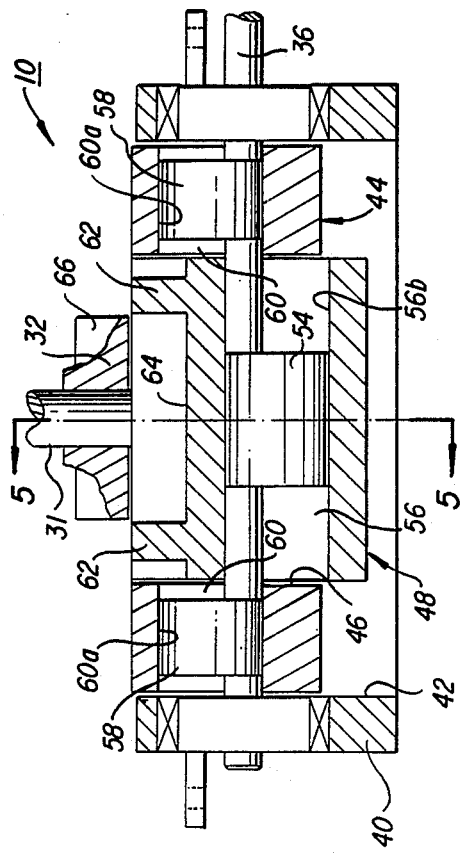

CROSSOVER MECHANISM FOR GUIDING A CAM FOLLOWER THROUGH A CAM TRACK INTERSECTION

The present invention relates to cam-driven mechanical mechanisms for converting rotary motion to linear reciprocating motion.

BACKGROUND OF THE INVENTION

There are numerous situations in the mechanical arts where it is necessary to linearly reciprocate a driven member or members in response to the rotary motion of a drive member. One practical approach to converting rotary to linear reciprocating motion is a cam-driven mechanism wherein a cam follower carried by the member to be reciprocated operates in a helical cam track of at least two revolutions, i.e., a 720° helical cam track. Typical applications of such mechanisms are in level wind mechanisms, valve actuators, gun mechanisms, etc. It will be appreciated that, in the case of 720° helical cam tracks, there is necessarily a cam track intersection where the track sidewalls are interrupted. The cam follower must therefore negotiate this track intersection in two different directions without the guidance afforded by the track sidewalls. One approach to ensuring smooth passage through a helical cam track intersection is to make the cam follower oblong or boat-shaped such that it effectively bridges the gaps in the track sidewalls at the intersection. Another approach, as disclosed in commonly assigned Chiabrandy U.S. Pat. No. 4,216,698, is to provide a rotary crossover switch carrying a pair of opposed sidewall segments which are selectively positioned to bridge the track sidewall gaps during cam follower transit of the intersection.

It is accordingly an object of the present invention to provide an improved crossover mechanism for guiding a cam follower through a cam track intersection.

A further object is to provide a crossover mechanism of the above-character wherein complete guidance of the cam follower through the intersection is conveniently and reliably assured.

An additional object is to provide a crossover mechanism of the above-character, wherein smooth transition of the cam follower through the track intersection at high speeds is readily accommodated.

Another object is to provide a crossover mechanism of the above-character wherein complete synchronism of its operation with the movement of the cam follower is accomplished in a simplified manner.

Yet another object is to provide a crossover mechanism of the above-character, which does not resort to special cam follower configurations.

A still further object is to provide a crossover mechanism of the above-character, which is simple and compact in construction, inexpensive to manufacture, and reliable over a long operating life.

Other objects of the invention will in part be obvious and impart appear hereinafter.

SUMMARY OF THE INVENTION

In accordance with the present invention, there is provided a crossover mechanism for guiding a cam follower through a helical cam track intersection, which utilizes a pair of crossover cam members mounted for radial reciprocation into and out of the track intersection in timed relation with the passage of the cam follower therethrough. The two crossover cam members telescopically arranged, one within the other, each carry a pair of opposed cam segments separated by a distance equal to the width of the portion of the track crossing the intersection in one direction and slightly less in length than the width of the portion of the track crossing the intersection in the other direction. The crossover cam members, when inserted into the track intersection, position their cam segments in bridging relation with the gaps in the track sidewalls thereat to controllably guide the cam follower therethrough in smooth running fashion. Reciprocation of the crossover cam members is effected by lobes eccentrically carried by a shaft driven in synchronism with the movement of the one or more cam followers through the helical cam track such that the cam segments are inserted into the track intersection in properly timed relation with the entry of each ca follower thereinto.

The invention accordingly comprises the features of construction, combination of elements, and arrangement of parts, all of which will be described hereinafter, and the scope of the invention will be indicated in the claims.

For a full understanding of the nature and objects of the invention, reference may be had to the following Detailed Description taken in connection with the accompanying in which:

FIG. 1 is fragmentary side view, partially broken away, illustrating a particular application of the crossover mechanism of the present invention to revolving battery guns, e.g. Gatling guns;

FIG. 2 is an idealized longitudinal sectional view of the crossover mechanism of the presention, illustrated in one of its conditions of guiding a cam follower through a helical cam track intersection.

FIG. 3 is fragmentary plan view in diagrammatic form illustrating the crossover mechanism condition of FIG. 2;

FIG. 4 is an idealized longitudinal sectional view illustrating the crossover mechanism in the other of its track cam follower-guidance conditions;

FIG. 5 is a transverse sectional view taken along line 5—5 of 4; and

FIG. 6 is a fragmentary plan view in diagrammatic form illustrating the crossover mechanism condition of FIGS. 4 and 5.

Corresponding reference numerals refer to like parts throughout the several views of the drawings.

DETAILED DESCRIPTION

The crossover mechanism of the present invention, generally indicated at 10, is illustrated in its application to a Gatling gun of the type disclosed in the above-cited Chiabrandy patent. Thus, as seen therein, a plurality of bolt assemblies, one simplistically illustrated at 12, are supported and guided for axial reciprocation in separate trackways 14 formed in a rotor 16. This rotor is coaxially mounted within the bore 17 of a cylindrical housing 18 for driven rotation by suitable means, such as a motor 20. Formed in this bore is a two revolution or 720° cam track 24, having a right hand thread portion, indicated in phantom at 26, and a left hand thread portion, indicated in phantom at 28, which cross each other at an intersection generally indicated at 30. Each bolt assembly 12 carries a shaft 31 rotatably mounting a cam follower 32 which runs in cam track 24, and thus driven rotation of the rotor causes the bolt assemblies to longitudinally reciprocate through an operating cycle between extreme front and rear dwell portions in the period of two complete rotor revolutions. Crossover mechanism 10 is affixed to the housing in an opening 33 via mounting ears 34 such as to be positioned in illustrated underlying relation with cam track intersection 30. The crossover mechanism includes an operating shaft 36 which is driven in synchronism with the rotor via suitable gearing, commonly indicated at 38.

Referring jointly to FIGS. 2, 4 and 5, crossover mechanism 10 includes a rectangular housing 40 which is bolted to gun housing 18 via ears 34. This mechanism housing is provided with a rectangular opening 42 in which is slidingly received on outer crossover cam member 44 in radially or vertically telescopic fashion. The outer crossover cam member is, in turn, provided with a generally rectangular opening 46 for slidingly receiving an inner crossover cam member 48. Shaft 36 penetrates mechanism housing 40 and is journalled for rotation at spaced shaft flanges 37 by bearings 50 fitted in collar openings 52. At a medial location with housing 40, shaft 36 eccentrically carries a lobe 54 which operates in a transverse, rectangular opening 56 in inner crossover cam member 48 to vertically reciprocate this member within the rectangular opening 46 in outer crossover cam member 44. To vertically reciprocate outer crossover cam member 44 within housing opening 42, shaft 36 eccentrically carries a pair of lobes 58, one to each side of lobe 54, which operate in spaced rectangular openings 60 in the outer crossover cam member. Lobes 58 are located on shaft 36 in diametrically opposed relation to lobe 54, and thus rotation of the shaft produces reciprocations of the outer and inner crossover cam members in 180° phased relation. That is, when the crossover mechanism is conditioned with its inner crossover cam member 48 in its extreme upper dwell position seen in FIG. 2, outer crossover cam member is in its extreme lower dwell position, and FIG. 4 illustrates the converse crossover mechanism condition.

Referring to FIGS. 2 and 3, inner crossover member 48 is provided with a pair of opposed cam segments 62 upstanding from a floor 64. As seen in FIG. 3, cam segments 62 are oriented in the direction of and separated by a distance equal to the width of the left hand thread portion 28 of the cam track 24 crossing intersection 30 and are each of a length slightly less than that of the width of the intersecting right hand thread cam track portion 26. Thus, when inner crossover cam member 48 is elevated to its uppermost dwell position proximate rotor 16 seen in FIG. 2 by the engagement of lobe 54 with the upper side 56a of opening 56, its cam segments 62 are radially inserted into intersection 30 in bridging relation with the gaps in the sidewalls of the cam track left hand thread portion 28 thereat. Lateral guidance and control is therefore afforded cam follower 32 by these cam segments as it moves through the intersection in the direction indicated by arrow 28a, for example. In addition, floor 64 is positioned in the intersection to substantially fill the gap in the floor of cam track portion 28 created to accommodate the installation of crossover mechanism 10. Floor 64 may thus provide radial guidance for the cam follower 32 as it negotiates the intersection, if desired.

Turning to FIGS. 4≧6, outer crossover cam member 44 is provided with a pair of upstanding cam segments 66 in flanking relation with inner crossover cam member 48. These cam segments, as seen in FIG. 6, are oriented in the direction of and separated by a distance equal to the width of right hand thread cam track portion 26 crossing intersection 30 and each of a length slightly less than the width of crossing left hand thread cam track portion 28. Thus when the outer crossover cam member is elevated into its uppermost dwell position by lobes 58 engaging the upper sides 60a of opening 60, its cam segments 66 are radially inserted into intersection 30 to substantially span the gaps in the sidewalls of cam track portion 26 thereat. Lateral guidance and control is therefore provided for cam follower 32 moving in right hand thread cam track portion 26 through the intersection in the direction indicated by arrow 26a, for example. Outer crossover cam member 44 may be formed with a ledge 68 of minimal width at the base of each cam segment 66 to provide, as best seen in FIG. 5, a measure of radial guidance for the cam follower as it transits the intersection, if desired.

By virtue of the diametrically opposed eccentricities of lobe 54 and lobes 58, when the cam segments 66 of outer crossover cam member 44 are radially (relative to the concentric axes of rotor 16 and housing 18) inserted into the intersection, the cam segments 62 of inner crossover cam member 48 are radially withdrawn from the intersection to a lower dwell position by the engagement of lobe 54 with the lower side 56b of opening 56 so as not to interfere with the movement therethrough of cam follower 32 running in track portion 26. Conversely, when cam segments 62 are radially inserted into the intersection, cam segments 66 are withdrawn to a lower dwell position by the engagement of lobes 58 with the lower sides 60b of openings 60, clearing the intersection for the cam follower running in cam track portion 28. Since the rotation of mechanism shaft 36 is geared with the rotation of rotor 16, synchronization of the upper dwell positionings (intersection insertions) of the crossover cam members 44 and 48 with the arrival at intersection 30 of the one or more cam followers running in cam track 24 can be readily achieved.

As best seen in FIG. 5, the heights of openings 56 and 60, i.e., the separation between their upper and lower sides, are substantially equal to the diameters of the circular lobes 54 and 58 operating therein, and the widths of these openings are substantially equal to the diameters of the circles swung by the extremities of these lobes. By virtue of this construction, positive control of the inner and outer crossover cam member positions is substantially maintained throughout each revolution of actuating shaft 36, and particularly while in their extreme dwell positions.

While not shown, the upper edges of cam segments 62 and 66 may be machined to a radius of curvature conforming to the radius of housing bore 17 so as to blend in with the bore surface when inserted into the intersection. Also, it should be pointed out that, in the application of crossover mechanism 10 seen in FIG. 1, the axis 36a of shaft 36 is diagonally aligned with intersection 30, as illustrated in FIGS. 3 and 6. Thus, the sectional views of FIGS. 2 and 4 are not true sections, but are idealized for ease of illustration and understanding.

It will be appreciated that the particular application of crossover mechanism 10 illustrated in FIG. 1 is merely illustrative and thus has utility in other applications other than Gatling gun mechanisms. Also, it will be understood that the helical cam track may be formed in rotating member, e.g. rotor 16, and the reciprocating member trackway formed in the stationary member, e.g. housing 18, in which case, crossover mechanism 10 would be mounted to the rotating member.

It is seen from the foregoing specification that the objects set forth above, including those made apparent herein, are efficiently attained, and, since certain changes may be made in the disclosed embodiment without departing from the scope of the invention, it is intended that all matters of detail contained herein be taken as illustrative and not in a limiting sense.

Having described the invention, what is claimed as new and desired to secure by Letters Patent is:

1. A crossover mechanism for guiding a cam follower through an intersection of right and left hand thread portions of a helical cam track, wherein the cam follower is carried by a reciprocating member mounted by one of a rotating member and a stationary member and the cam track is carried by the other of the rotating and stationary members, said crossover mechanism comprising, in combination:
   A. a housing affixed to the one of the rotating and stationary members carrying the cam track;
   B. a first crossover cam member mounted for reciprocation within said housing and having first cam segments;
   C. a second crossover cam member mounted for reciprocation within said housing and having second cam segments; and
   D. an actuator introduced into said housing, said actuator carrying a first actuating element for reciprocating said first crossover cam member relative to the cam track intersection and a second actuating element for reciprocating said second crossover cam member relative to the cam track intersection, whereby said first actuating element inserts said first cam segments into the intersection to guide the cam follower therethrough while the cam follower is moving in the right hand thread portion of the cam track and said second actuating element inserts said second cam segments into the intersection to guide the cam follower therethrough while the cam follower is moving in the left hand thread portion of the cam track.

2. The crossover mechanism defined in claim 1, wherein said first and second actuating elements respectively reciprocate said first and second crossover cam members in phased relation such that, when one of said first and second cam segments is inserted into the intersection, the other of said first and second cam segments is withdrawn from the intersection in non-interfering relation with the cam follower moving therethrough.

3. The crossover mechanism defined in claim 2, wherein said first cam segments are positioned and dimensioned such as, upon insertion into the intersection, to effectively bridge a first gap in the right hand thread portion of the cam track at the intersection, and said second cam segments are positioned and dimensioned such as, upon insertion into the intersection, to effectively bridge a second gap in the left hand thread portion of the cam track at the intersection.

4. The crossover mechanism defined in claim 3, wherein said actuator is operated in synchronism with rotation of the rotating member.

5. The crossover mechanism defined in claim 3, wherein said housing includes a first guide opening in which said first crossover cam member is reciprocatingly mounted, and said first crossover cam member includes second guide opening in which said second crossover cam member is reciprocatingly mounted.

6. The crossover mechanism defined in claim 5, wherein said actuator comprises a rotating shaft on which said first and second actuating elements are eccentrically mounted in angularly and axially spaced relation.

7. The crossover mechanism defined in claim 6, wherein said shaft is rotated in synchronism with the rotating member.

8. The crossover mechanism defined in claim 7, wherein said first and second crossover cam members respectively include first and second actuating openings through which said shaft extends, said first actuating element acting against opposed sides of said first actuating opening to reciprocate said first crossover cam member between an extreme first dwell position with said first cam segments inserted into the intersection and an extreme second dwell position with said first cam segments fully withdrawn from the intersection, and said second actuating element acting against opposed sides of said second actuating opening to reciprocate said second crossover cam member between an extreme third dwell position with said second cam segments inserted into the intersection and an extreme fourth dwell position with said second cam segments fully withdrawn from the intersection.

9. The crossover mechanism defined in claim 8, wherein heights of said first and second actuating elements are respectively substantially equal to separations between said opposed sides of said first and second actuating openings, whereby said actuating elements exert positive control on said crossover cam members while in their said extreme dwell positions.

10. The crossover mechanism defined in claim 9, wherein said first and second actuating members are in the form of circular lobes.

11. In a gun mechanism including a drum-shaped rotor mounted for rotation concentrically within a cylindrical bore of a stationary housing, a helical cam track formed in said housing bore having track portions crossing at an intersection, at least one trackway formed in a peripheral surface of said rotor for guiding a bolt assembly in reciprocating motion parallel to the rotor axis, and a cam follower carried by said bolt assembly and received in said cam track, a crossover mechanism comprising:
   first and second crossover cam members mounted to said housing for separate radial reciprocation relative to said rotor axis in synchronism with rotation of said rotor alternately into and out of said cam track intersection, whereby said first crossover cam member, upon insertion into said intersection, guides said cam follower therethrough while said cam follower is moving in one of said cam track crossing portions, and said second crossover cam member, upon insertion into said intersection, guide said cam follower therethrough while said cam follower is moving in the other of said cam track crossing portions.

12. In a cam and cam follower mechanical drive arrangement wherein the cam follower is received in and moves along a cam track having portions thereof crossing at an intersection, a crossover mechanism comprising:
   first and second crossover cam members separately mounted for reciprocation between respective extreme first and second dwell positions relative to the track intersection in coordination with the movement of the cam follower along the cam track, said first crossover cam member, while in its said first dwell position, guiding the cam follower through the intersection while the cam follower is moving in one of the crossing cam track portions, and said second crossover cam member, while in its said first dwell position, guiding the cam follower through the intersection while the cam follower is moving in the other of the crossing cam track portions, said first and second crossover cam members, while in their respective said second dwell positions, being disposed in non-interfering relation with movement of the cam follower through the intersection.

13. The crossover mechanism defined in claim 12, wherein said first and second crossover cam members are relatively telescopically mounted for reciprocation.

14. The crossover mechanism defined in claim 13, which further includes an actuator for reciprocating said first and second crossover cam members in phased relation, such that, when one of said members is in its said first dwell position, the other of said members is in its said second dwell position.

* * * * *